United States Patent

[11] 3,583,430

| [72] | Inventor | Erling P. Toennesen<br>102 Ruggles Ave., Newport, R.I. 02840 |
|---|---|---|
| [21] | Appl. No. | 819,399 |
| [22] | Filed | Apr. 25, 1969 |
| [45] | Patented | June 8, 1971 |

[54] ANNULAR FLEXIBLE VALVE
9 Claims, 10 Drawing Figs.

[52] U.S. Cl. .................................. 137/468,
  137/512.15, 137/525, 236/92, 236/93
[51] Int. Cl. ................................................ F16k 15/14
[50] Field of Search .......................................... 137/468,
  512.15, 512.4, 525; 236/92, 92 C, 93

[56] References Cited
UNITED STATES PATENTS
| 2,054,997 | 9/1936 | Vang | 236/93UX |
|---|---|---|---|
| 2,673,687 | 3/1954 | Alban et al. | 236/93 |
| 2,743,899 | 5/1956 | Kinney | 137/525 |
| 3,451,422 | 6/1969 | Chorkey | 137/525 |

FOREIGN PATENTS
| 1,177,886 | 9/1964 | Germany | 137/525 |
|---|---|---|---|
| 344,598 | 3/1960 | Switzerland | 137/525 |

Primary Examiner—Robert G. Nilson
Attorney—Barlow and Barlow

ABSTRACT: A valve having spaced annular seats converging toward each other with a single moving annular valve member of flexible material of low inertia and fast response engaging the annular seats in proportion to the pressures of the fluid which it handles on either side of the valve including an adjustment of one of the seats. This valve may also incorporate a temperature control for providing a reverse flow.

PATENTED JUN 8 1971

INVENTOR
ERLING P. TOENNESEN

BY
Barlow & Barlow
ATTORNEYS

INVENTOR
ERLING P. TOENNESEN
BY
Barlow & Barlow
ATTORNEYS

ANNULAR FLEXIBLE VALVE

BACKGROUND OF THE INVENTION

Valve assemblies usually provide a single seat against which some member may close to prevent flow in one direction while bodily moving or flexing to open by movement away from the seat to permit flow in the opposite direction. Usually the materials employed have considerable inertia by reason of a substantial mass and therefore have a slow response and high speed operation is limited by such criteria and fluid friction. In some cases several moving parts are utilized. No reverse flow is permitted.

SUMMARY OF THE INVENTION

A valve assembly having spaced annular valve seats located between inlet and outlet conduits which seats converge toward each other with a flexible annular valve member of generally U or V, conical, or partially spherical cross section disposed between the seats and normally in engagement with each seat. Comparative pressures on opposite sides of the member cause the greater pressure on the apex side of the cross section to permit fluid to move the extremities of the member toward each other to pass fluid while if greater pressure exists on the opposite side of the valve member, the valve member is spread into engagement with the seats to prevent flow. Flow may take place circumferentially about the annular valve thus providing low inertia of the mass to be moved and fast response in a single moving part, less force being required to close the valve when a pressure exists on a side to close it. The valve member is made of a flexible material which may be resilient and is arranged to have a tendency to move in a direction to close against the valve seats. The valve when of bimetal also exercises a temperature control which may permit a reverse flow.

DESCRIPTION OF THE PREFERRED EMBODIMENTS

Figure 1:
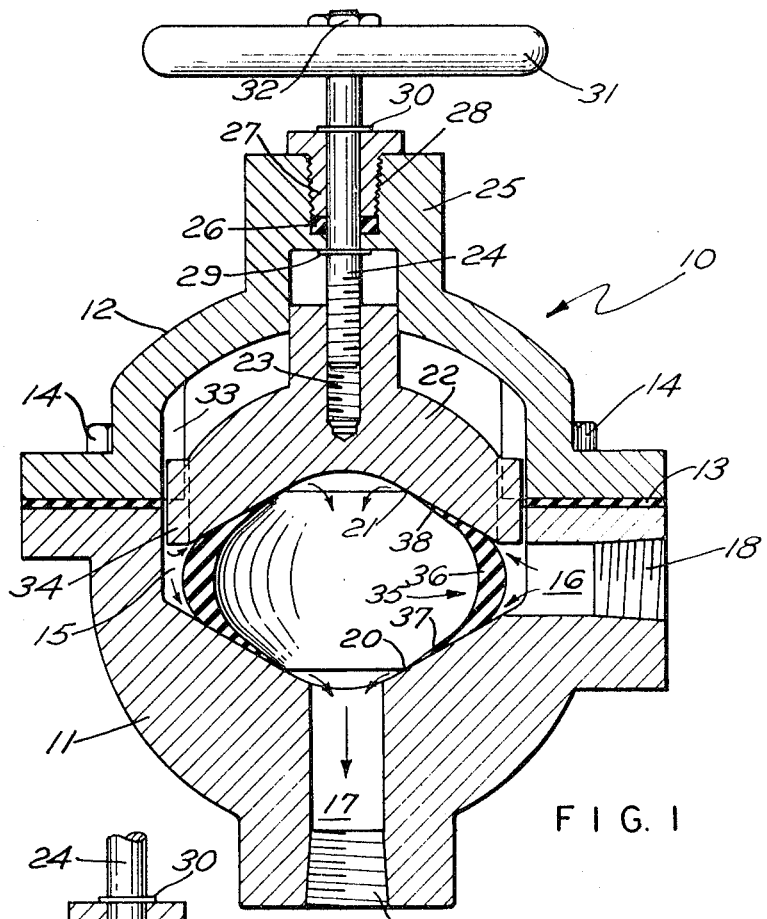
FIG. 1 is a sectional view illustrating a generally conventional structure with the valve member of this invention.
Figure 2:
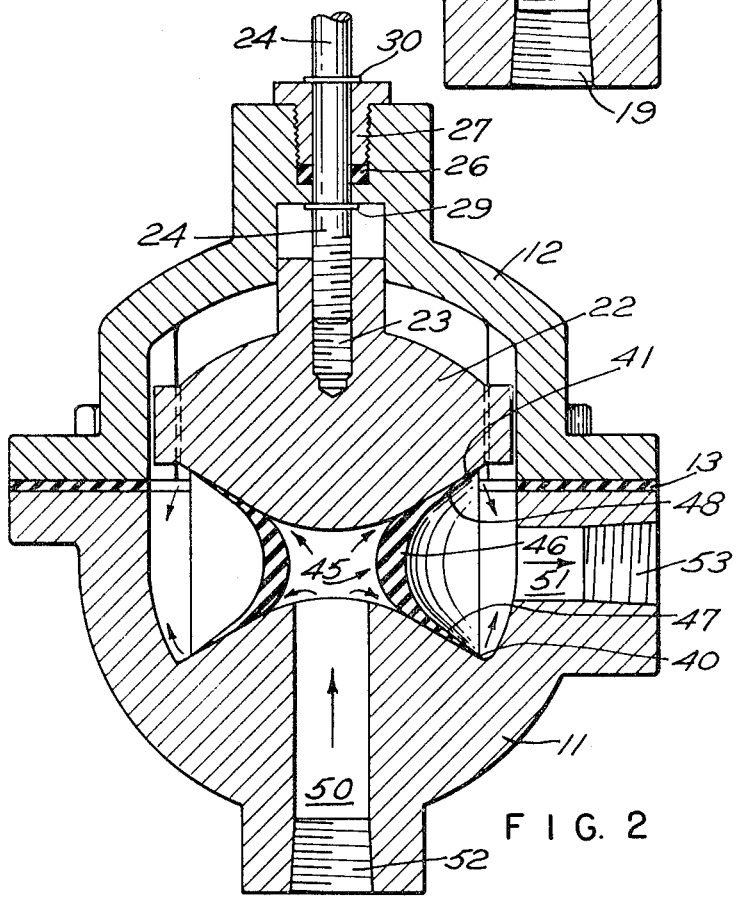
FIG. 2 is a view similar to FIG. 1 but showing a modified form of valve construction.
Figure 10:
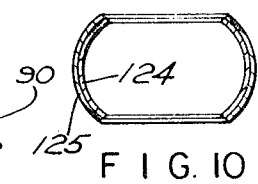

With reference to the drawings and particularly FIGS. 1 and 2, 10 designates the valve body comprising a lower part 11 and an upper part 12 each shaped to form hollow chamber 15 within and brought together in sealed relation against a packing 13 and held assembled by means of bolts 14. Chamber 15 is provided with an inlet conduit 16 and an exhaust conduit 17 which are suitably threaded as at 18 and 19 for the connection of fluid conduits thereto. The lower part 11 is provided with an annular seat 20 which is inclined with reference to the axis of both inlet discharges conduit 16, 17 leading to and from the chamber 15. This seat is of substantial extent and is of an acute angle although this angle is not critical. A second annular seat 21 is provided in spaced relation to annular seat 20 and has substantially the same but opposite inclination as the seat 20. This seat is formed on a member 22 which may be moved toward and from the seat 20 by reason of the threaded bore 23 extending into this member and a threaded shaft 24 which extends through the upper part 25 of the upper part 12 of the valve body. A packing 26 surrounds this shaft 24 and is held in sealed relation by the threaded plug 27 which surrounds this shaft and by means of screw threads 28 the packing may be tightened upon the shaft to prevent fluid from emerging along the shaft. Spring rings 29 and 30 may be snapped into engagement in recesses in the shaft so that the shaft will not move vertically or axially as the handle 31 held on the shaft by nut 32 rotates the shaft to move the member 22 axially of the shaft. Power means or a remote control may be utilized for operating shaft 24. A key and keyway 33 and 34 between member 22 and the valve body prevent turning of the member 22 in the valve body although movement axially of the shaft 24 is permitted. An annular flexible valve member 35 having its seat engaging faces at an angle to a plane passing through its center is provided by which is included substantially U, V, conical, or partially spherical shape in cross section which cross section may be uniform as in FIG. 5 or it may have a heavy mid portion 36 tapering to highly flexible ends 37 and 38 (FIGS. 1 and 2) which is so shaped that when located between the sealing surfaces 20 and 21 it tends to expand and press against them. This member 35 may be a rubber or synthetic rubber or a plastic material or in some cases might be metal or a combination of metal and plastic materials, the essential being that it be flexible preferably, although not necessarily, of some resilience so that the edges tend to expand against the sealing surfaces of the body. The cross section shape of the annular member 35 especially a shape with thin extremities provides a very low mass and consequently low inertia of the two arms of the general V shape cross section of the valve member so that there is fast response and yet a single moving part thus providing an action which is very delicate. Fluid pressure entering at 16 which is greater than the pressure in the exhaust conduit 17 will cause the valve member to flex and permit fluid to pass throughout 360° of arc along both valve seats 20 and 21 by reason of the flexure of the arms of the V and yet if the pressure in 17 is greater than it is at 16 the arms will expand against the valve seats 21 and 20 as a function of the pressure to increase the seating area as the pressure increases and prevent any flow of fluid in the opposite direction. When the valve is of resilient material such as rubber or synthetic rubber, the circular conical vane type exists to provide a good resilience for closure.

In some cases instead of the valve seats being arranged as shown in FIG. 1, the valve seats in FIG. 2 at 40 and 41 may be provided where here as before the seats diverge away from each other except in FIG. 2 the divergence is in the opposite direction from the inside out and the valve member 45 is provided in reverse with its heavy portion 46 in this center and thinned-out arms 47 and 48 diverging therefrom. In this case the entrance conduit 50 delivers fluid pressure into the center of the chamber while it exhausts as at 51 both of which are provided with threaded parts 52 and 53 for the connection of conduits thereto. The showing in FIG. 2 is otherwise substantially the same as in FIG. 1 and corresponding reference numerals are applied.

Figure 3:
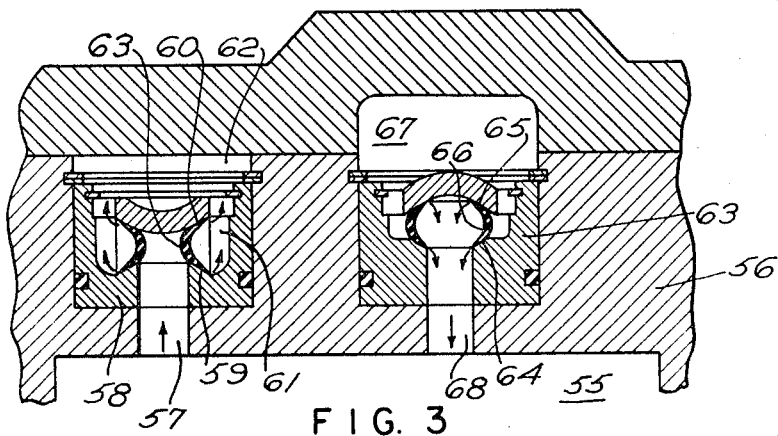
FIG. 3 is a sectional view showing one of the walls of a pump body which embraces the chamber and piston therein and illustrating both intake and exhaust valves therein.

In the showing in FIG. 3, the chamber of a pump is shown at 55 in which the piston of the pump operates. A wall of the pump body is designated at 56 and houses both exhaust and intake valves therein. An exhaust conduit 57 has a valve unit 58 which provides inclined seats 59 and 60 with an exhaust passage 61 about the seat 60 extending through a further passage 62. The annular valve 63 is of generally V shape in cross section as heretofore set forth engages the seats 59 and 60 so that as the chamber exhausts through the conduit 57, the fluid will pass about both seats 59 and 60 and exhaust through the passages 61 and 62. This valve unit 58 could be located in the piston.

On the intake side there is a valve unit 63 which has valve seats 64 and 65 of annular form with an annular valve 66 of generally V shape in cross section engaging these seats 64 and 65. An intake passage 67 is provided and when the pressure in passage 68 becomes lower than that in 67 fluid will pass along the seats 64 and 65 into the conduit 68 and thence into the chamber 55.

Figure 4:
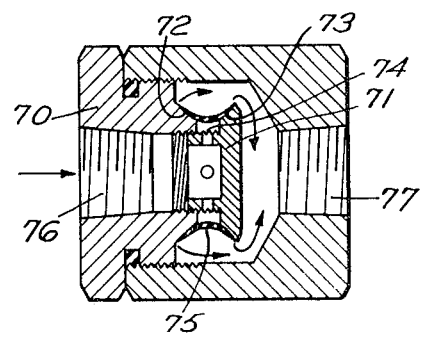
FIG. 4 is a sectional view illustrating a check valve utilizing the valve member of this invention instead of an O-ring.

In FIG. 4 a check valve is provided in which there is a body 70 with an adjustable member 71 providing spaced valve seats as at 72 on the body 70 and 73 on the member 71. The member 71 is threaded as at 74 for adjustment of the seats. An annular valve 75 of generally V shape construction engages the seats 72 and 73 so that flow inwardly at 76 with a pressure greater than the flow outwardly at 77 will permit the fluid to pass about the two seats 72 and 73 into the passage 77 for free flow on its way, although any reverse pressure which might exist at 77 greater than the pressure at 76 will prevent the backward flow by reason of the forcing of the V shape annular valve into engagement with seats on the principle heretofore discussed above.

Figure 5:
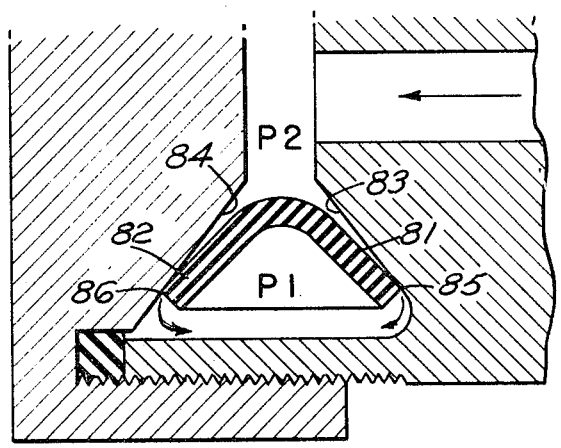
FIG. 5 is a sectional view illustrating a valve member of generally uniform cross section.

In FIG. 5 I have illustrated a valve member 80, and arms 81 and 82 of which are substantially of uniform thickness throughout their extent rather than tapered. In this case these arms will make an included angle normally a little greater than the included angle between the valve seats 83 and 84 so as to insure initial contact of the arms at 85 and 86 should the pressure at P1 be greater than the pressure at P2. However, when the pressure of P2 is greater than P1, the valve arms would move toward each other to permit the passage of fluid along the arms and between the arms and the valve seats 83 and 84.

From the above it will be apparent that the valve of this invention may be utilized in conventional valves, check valves, relief valves, regulator valves, flow control valves, or built-in pump valves.

Figures 6, 8:
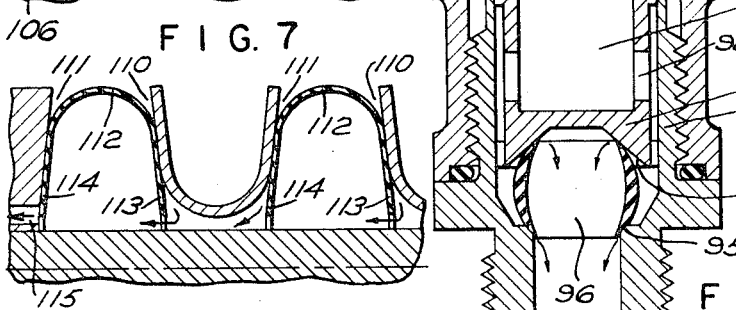
FIG. 6 is a sectional view of an inline valve.

In FIG. 6 an inline valve 90 is shown having a body 91 with a closure 92 having an insert 93. Valve seats 94, 95 are inclined with reference to a plane between them and an annular valve 96 of generally pseudo spherical-shape engaging these seats 94, 95. An intake passage 97, 98 is provided to the outer surface of the valve 96 and a discharge passage 99 extends from the center of the valve 96. The operation is similar to that shown in FIG. 1 or unit 63 in FIG. 3.

Figure 7:
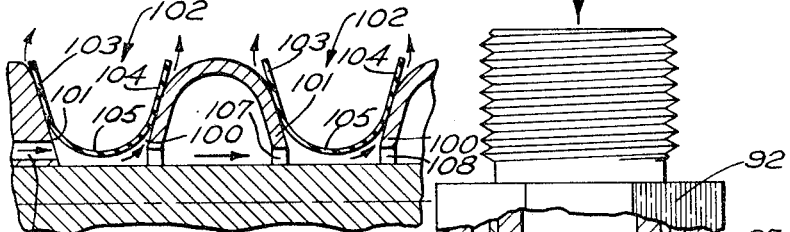
FIGS. 7 and 8 are sectional views of the use of the valves in multiple.

In FIGS. 7 and 8 there are a plurality of valves to additionally increase the flow when desired. In FIG. 7 there are a plurality of pairs of converging or inclined surfaces 100, 101 with a valve 102 having arms 013, 104 diverging from bridging portion 105 and resiliently urged by their inherent spreading action against their inclined seats. The supply flow may enter at 106 and pass along through passages 107, 108 and other similar passages to each valve. In FIG. 8 the inclination at 110 and 111 is opposite from FIG. 7 and the valves 112 are inverted from FIG. 7 for flow in the opposite direction with the arms 113, 114 engaging the seats and an outlet at 115.

Figure 9:
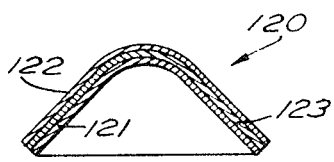
FIGS. 9 and 10 are sectional views of a valve formed of a plurality of layers of different metals.

In FIG. 9 I have shown a valve 120 of a plurality of layers of metal of different coefficients of expansion wherein there is an inner layer 121 and an outer layer 122 with an intermediate layer 123 if desired. This valve will be resilient and act as the valve before described but additionally should the fluid being handled become heated beyond a desired temperature the valve will flex by the action of the bimetal structure to open. This may also occur on the high pressure side P1 of FIG. 5 to apply a pressure greater than desired and the bimetal structure will cause the valve to open to permit reverse flow which a check valve has heretofore been unable to accomplish.

In FIG. 10 there is shown the type of valve shown in all figures except FIG. 5 with bimetal 124 and 125 of different coefficients of expansion to change the valve by reason of different temperature conditions as described for FIG. 9.

It will be apparent that the valves above described may operate where a partial vacuum is formed on the discharge side with atmospheric pressure on the supply side or wherever there is a differential or pressure on opposite sides of the valve.

I claim:

1. A valve assembly comprising a body having inlet and outlet conduits, first and second annular valve seats on said body located between said conduits and having sealing surfaces, the sealing surfaces of said valve seats converging toward each other, a flexible annular valve member disposed between said first and second seats and normally in engagement therewith, said valve member having its opposite seat engaging faces inclined with reference to a plane between said sealing surfaces, whereby fluid pressure applied on one side of the valve member will cause deflection of the extremities of the valve member toward each other to unseat the valve, and fluid pressure applied on the other side of the valve member will cause deflection of the extremities of the valve member away from each other to seat the valve.

2. A valve assembly as in claim 1 wherein one of the seats is movable toward the other seat to vary the pressure on the valve.

3. A valve assembly as in claim 1 wherein the valve member has a thickness gradually diminishing toward the extremities of the valve member.

4. A valve assembly as in claim 1 wherein the valve member has a thickness which is constant throughout.

5. A valve assembly as in claim 1 wherein the valve member is laminated of plastic materials.

6. A valve assembly as in claim 1 wherein the valve member is metal and plastic material.

7. A valve assembly as in claim 1 wherein the inclined faces of the valve member have an inherent tendency to spread apart to provide a greater included angle.

8. A valve assembly as in claim 1 wherein there are a plurality of valves between the inlet and discharge.

9. A valve assembly comprising a body having inlet and outlet conduits, first and second annular valve seats on said body located between said conduits and having sealing surfaces, the sealing surfaces of said valve seats converging toward each other, a flexible annular valve member disposed between said first and second seats and normally in engagement therewith, said valve member having its opposite seat engaging faces inclined with reference to a plane between said sealing surfaces, said valve member being formed of a plurality of materials of different coefficients of expansion whereby a control of the valve member occurs by the temperature to which it is subjected.